(12) United States Patent
Srinivasan et al.

(10) Patent No.: US 11,533,618 B2
(45) Date of Patent: *Dec. 20, 2022

(54) SYSTEM AND METHOD TO RETRIEVE A SECURE MESSAGE WHEN A DISPLAY OF A MOBILE DEVICE IS INACCESSIBLE

(71) Applicant: Rovi Guides, Inc., San Jose, CA (US)

(72) Inventors: Madhusudhan Srinivasan, Bangalore (IN); Ramesh Alagarsamy, Bangalore (IN)

(73) Assignee: Rovi Product Corporation, San Jose, CA (US)

( * ) Notice: Subject to any disclaimer, the term of this patent is extended or adjusted under 35 U.S.C. 154(b) by 239 days.

This patent is subject to a terminal disclaimer.

(21) Appl. No.: 17/073,826

(22) Filed: Oct. 19, 2020

(65) Prior Publication Data
US 2021/0099879 A1    Apr. 1, 2021

Related U.S. Application Data

(63) Continuation of application No. 16/161,649, filed on Oct. 16, 2018, now Pat. No. 10,848,973.

(51) Int. Cl.
| | | |
|---|---|---|
| *H04L 29/06* | (2006.01) | |
| *H04W 12/08* | (2021.01) | |
| *G06F 21/35* | (2013.01) | |
| *G10L 15/26* | (2006.01) | |
| *H04W 4/02* | (2018.01) | |
| *G06F 21/42* | (2013.01) | |

(52) U.S. Cl.
CPC ......... *H04W 12/08* (2013.01); *G06F 21/35* (2013.01); *G06F 21/42* (2013.01); *G10L 15/26* (2013.01); *H04M 2201/38* (2013.01); *H04W 4/02* (2013.01)

(58) Field of Classification Search
CPC ........ G06F 21/35; G06F 21/42; H04W 12/08; H04L 63/107; H04L 63/08; H04L 63/20
USPC ............................................................. 726/5
See application file for complete search history.

(56) References Cited

U.S. PATENT DOCUMENTS

| | | | |
|---|---|---|---|
| 8,600,368 B2 ‡ | 12/2013 | Shaw | H04M 11/10 455/41 |
| 9,092,885 B2 * | 7/2015 | Scholl | G06T 13/00 |
| 9,332,244 B2 | 5/2016 | Tsuyuki | |
| 10,212,119 B2 * | 2/2019 | Bisarya | H04L 67/306 |
| 2007/0289002 A1 * | 12/2007 | van der Horst | G06F 21/42 713/185 |
| 2009/0295735 A1 * | 12/2009 | Wang | G10L 13/00 345/169 |

OTHER PUBLICATIONS

U.S. Appl. No. 09/332,244, filed Jun. 11, 1999.‡

* cited by examiner
‡ imported from a related application

*Primary Examiner* — Longbit Chai
(74) *Attorney, Agent, or Firm* — Haley Guiliano LLP (57) ABSTRACT

Systems and methods are described for providing a security code to a second device. A first device receives a textual representation of a security code that is required for authorization of a second device with a remote application server. The first device checks if the textual representation of the security code is accessed during a predefined time period. If not, the first device also checks if the second device is within an output range of the first device. If so, the first device outputs an audio representation of the security code.

20 Claims, 7 Drawing Sheets

SYSTEM AND METHOD TO RETRIEVE A SECURE MESSAGE WHEN A DISPLAY OF A MOBILE DEVICE IS INACCESSIBLE

CROSS-REFERENCE TO RELATED APPLICATION

This application is a Continuation of U.S. patent application Ser. No. 16/161,649, filed on Oct. 16, 2018. The disclosure of each application is hereby incorporated by reference herein in its entirety.

BACKGROUND

This disclosure is generally directed to systems and methods for user authorization. In particular, techniques are described for improved delivery of security codes needed for user authorization (e.g., for multi-factor user authorization).

SUMMARY

Multi-factor authorization systems, when authenticating a user on a primary device (e.g., a desktop computer), commonly require a secondary device (e.g., a cell phone) to receive a security code. For example, the security code may be sent via Short Messaging Service (SMS). The user is then prompted to enter the security code via the primary device. Once the security code is entered via the primary device, the authorization is complete. Commonly the user may not have immediate access to the secondary device. For example, the user's cell phone may be located across the room from the user's desktop. In such cases it is slow and inconvenient for the user to physically access the cell phone. Furthermore, because security codes conventionally have a short expiration time (e.g., 30 seconds), they may expire while the user is walking to retrieve the cell phone and walking back to the primary device. This may cause a failure in the authorization process that forces the user to restart the process from the beginning.

To overcome these problems, systems and methods are described herein for outputting a representation of a security code (e.g., a code needed for authorization) when the code is not accessed quickly enough. The security code may be received via a first device. If the user does not access the security code within a predefined time period, a representation of the security code (e.g., an audio version) is outputted. In some embodiments, the security code is only outputted when there is a second device that is within an output range of the first device. In this way, a user may complete the authorization more quickly (e.g., before the security code expires) and without a need to physically access the first device.

In one embodiment, a textual representation of a security code is received by a first device (e.g., as an SMS message via a cell phone of the user). The security code may be sent to the user's cell phone as a part of an authorization process initiated via a second device (e.g., user's desktop). After a predefined time period, an authorization application determines that the textual reputation was not accessed by the user. For example, the authorization application may determine that the SMS containing the security code is marked as "unread" after 15 seconds have passed since the receipt of the SMS message. In response, the authorization application determines if a second device of the user is within an output range of the first device. For example, the authorization application may determine that the user's desktop is close enough to the cell phone for the speaker of the cell phone to deliver an audio message. In this case, the authorization application synthesizes an audio representation of the security code (e.g., using a test-to-speech algorithm). The audio representation is then outputted using a speaker of the first device. The security code is then received via the second device without the need for the user to physically walk over and retrieve the first device. Because the need for the user to physically access the first device is eliminated, the authorization occurs faster and the risk of the authorization failing due to the security codes expiring is significantly reduced.

In some embodiments, the first device may transmit a representation of the security code in an encrypted format. For example, the first device may establish a connection with the second device via a short-range communication channel (e.g., Bluetooth or home Wi-Fi network). In this case, the authorization application may encrypt the security code (e.g., using private key or public key encryption scheme) and transmit the encrypted message to the second device via the established connection. The second device may decrypt the security code and display it for the user on a screen of the second device. In some embodiments, second device automatically (e.g., without user input) decrypts the security code and enters it as a part of the authorization procedure.

In some embodiments, an authorization application may determine that the textual representation of the security codes was not accessed by the user using one of a several techniques. For example, when the textual representation is an SMS message, the authorization application may query an Application Programming Interface (API) of a text-messaging application and check that the SMS is still marked as unread after the predefined time period. In another example, the authorization application may access an API of the operating system to determine that no user input was received at all (e.g., no touch or voice input was registered). The authorization application determines that since no user input occurred, then the textual reputation of the security codes is still unread. In yet another example, the authorization application may determine that the security code was not accessed because the second device (e.g., the desktop) did not receive an input of the security codes during the predefined time period.

In some embodiments, the authorization application may output the audio representation only when the second device is within output range of the first device. The authorization application may determine the output range based on physical capabilities of the first device. For example, the authorization application may determine output power of a speaker of the first device. In some embodiments, the authorization application accesses specifications of the first device and determines that the speaker has an output power of 2 watts. The authorization application then calculates the output range based on the output power using a formula or a lookup table. For example, the output power of 2 watts may correspond to a range of 50 feet, while the output power of 1 watt may correspond to a range of 25 feet.

In some embodiments, the authorization application may use one of several techniques to determine if the second device is within output range of the first device. For example, the authorization application may determine the positions of the first device and the second device using GPS sensors or cell signal triangulation. The authorization application then computes the distance between the devices based on their positions. In another example, the authorization application sends a test signal (e.g., a network signal or an audio signal) from the first device to the second device. The time difference between sending and receiving the signal is used to compute the distance between the devices. The authorization application compares that computed distance to the output range to check if the second device is in range.

In some embodiments, the authorization application outputs the audio representation of the security code only if the user authorizes such output. For example, the authorization application may generate a query prompting the user to provide the output authorization (e.g., "Security Code Received, read now?"). If the user responds affirmatively to the query (e.g., by saying "Yes"), the authorization application outputs the audio representation of the security code.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
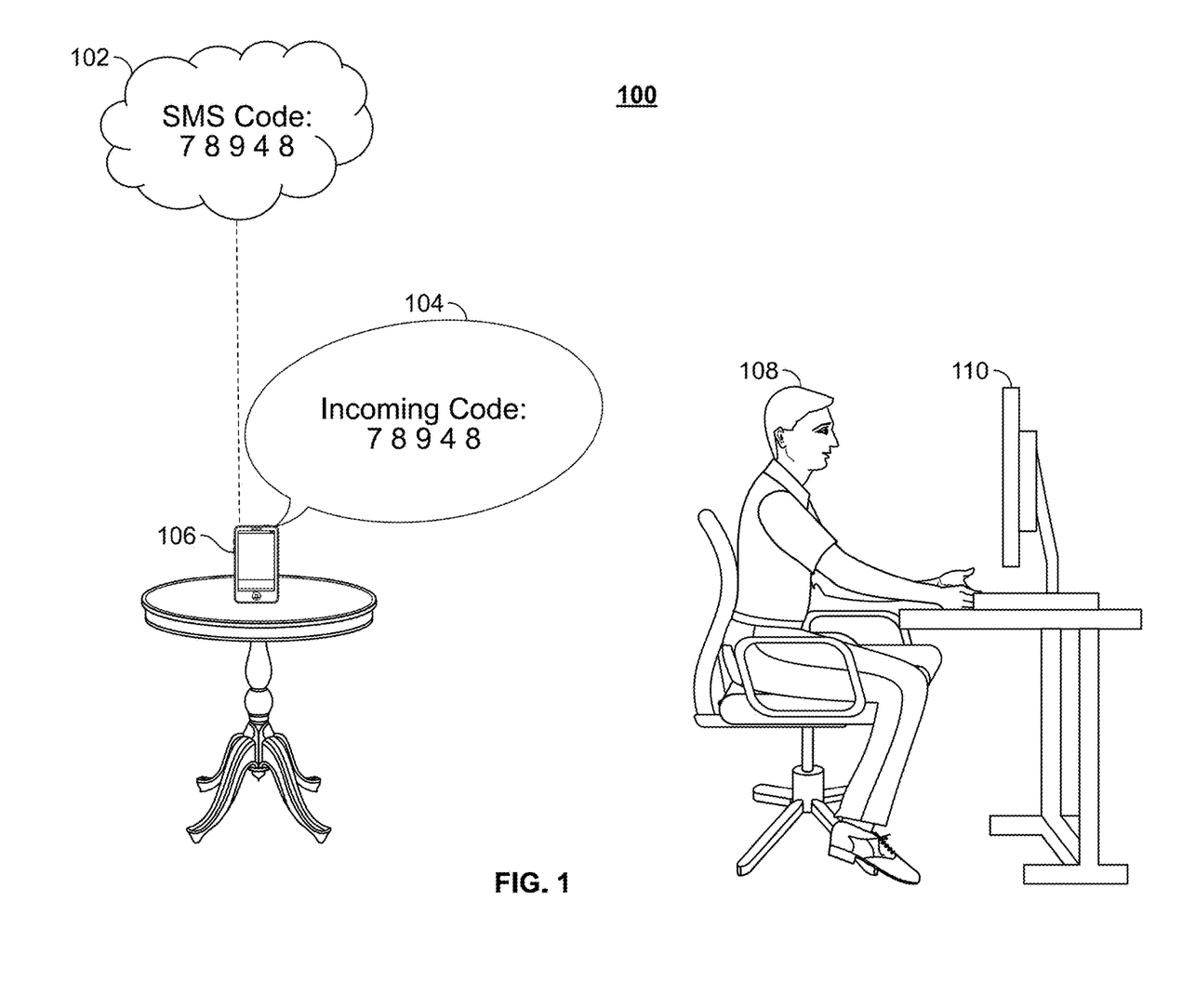
FIG. 1 shows an illustrative example of a scenario for providing a security code, in accordance with some embodiments of the disclosure.

FIG. 1 shows an illustrative example 100 of a scenario for providing a security code via an audio output of mobile user device 106 (e.g., user's phone). In some embodiments, user 108 attempts to authenticate with a remote application via user device 110 (e.g., user's desktop). For example, a browser running on an operating system of user device 110 receives, as a part of an email account log-in request, a user name and password combination. In some embodiments, the remote application (e.g., the email service) requires a multi-step authorization. For example, the remote application may require an entry (in addition to the user name and password) of a security code that is sent to mobile user device 106.

In some embodiments, the remote application sends a textual representation 102 of the security code to mobile user device 106 in response to the authorization attempted via user device 110. For example, mobile user device 106 receives a textual representation 102 of the security code via SMS. FIG. 1 shows an SMS message containing text "78948," however, any other code may also be used. In some embodiments, the security code is randomly generated.

The authorization application (e.g., an application executing on mobile user device 106) may track whether the user has accessed textual representation 102 of the security code in a predefined time period (e.g., 15 seconds). In some embodiments, the predefined time period may be set by the authorization application, configured by the user, or dynamically calculated.

In some embodiments, the authorization application may check if user device 110 is within the output range of mobile user device 106. For example, the authorization application may determine a position of user device 110 and a position of mobile user device 106 using GPS sensors of these devices or by using cellular triangulation techniques. The authorization application then determines the distance between user device 110 and mobile user device 106 based on their positions. The distance is compared to the output range of mobile user device 106 to check if user device 110 is within the output range of mobile user device 106.

In some embodiments, if the user device 110 is within the output range of mobile user device 106, the authorization application uses a speaker of mobile user device 106 to output audio representation 104 of the security code. Subsequently, the security code may be received by user device 110, thus completing the authorization. In one embodiment, user device 110 receives the output audio representation 104 of the security code via a microphone and automatically transmits it to the remote application as part of the authorization process. In some embodiments, the security code is received by user device 110 via any other input device (e.g., keyboard).

Each of user device 106 and user device 110 may be any device, such as a television, a Smart TV, a set-top box, a personal computer (PC), a laptop computer, a tablet computer, a WebTV box, a personal computer television (PC/TV), a PC media server, a PC media center, a handheld computer, a personal digital assistant (PDA), a mobile telephone, a smartphone, or any other television equipment, computing equipment, or wireless device, and/or combination of the same.

Figure 2:
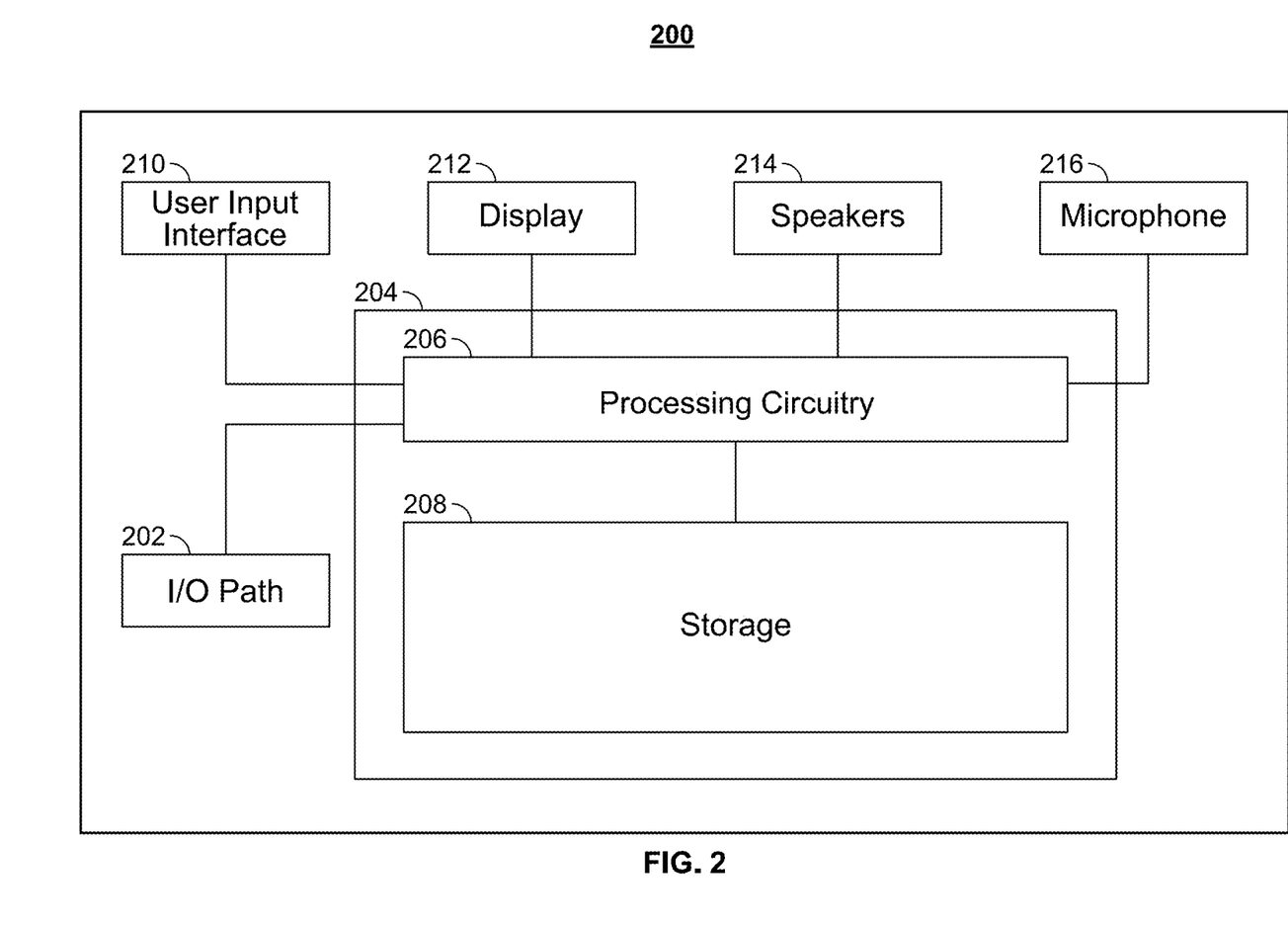
FIG. 2 is a diagram of an illustrative user system in accordance with some embodiments of the disclosure.

FIG. 2 depicts a generalized embodiment of an illustrative device (e.g., any one of user device 106 and 110). User device 200 may receive content and data via input/output (hereinafter "I/O") path 202. I/O path 202 may provide content (e.g., on-demand programming, Internet content, content available over a local area network (LAN) or wide area network (WAN), and/or other content) and data to control circuitry 204, which includes processing circuitry 206 and storage 208. Control circuitry 204 may be used to send and receive commands, requests, and other suitable data using I/O path 202. I/O path 202 may connect control circuitry 204 (and specifically processing circuitry 206) to one or more communications paths (described below in relation to FIG. 3). I/O functions may be provided by one or more of these communications paths but are shown as a single path in FIG. 2 to avoid overcomplicating the drawing.

Control circuitry 204 may be based on any suitable processing circuitry such as processing circuitry 206. Processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., quad-core). In some embodiments, processing circuitry may be distributed across multiple separate processor or processing units, for example, multiple of the same type of processing units (e.g., two Intel Core i7 processors) or multiple different processors (e.g., Ryzen processor with integrated CPU and GPU processing cores). In some embodiments, control circuitry 204 executes instructions for an application stored in memory (e.g., storage 208). Specifically, control circuitry 204 may be instructed by an authorization application to perform the functions discussed above and below. For example, the authorization application may provide instructions to control circuitry 204 to output a security code. In some implementations, any action performed by control circuitry 204 may be based on instructions received from the authorization application.

Control circuitry 204 may include tuning circuitry, such as one or more analog tuners, one or more MP3 decoders or other digital decoding circuitry, or any other suitable tuning or audio circuits or combinations of such circuits. Encoding circuitry (e.g., for converting analog or digital signals to signals for storage in storage 208) may also be provided. Control circuitry 204 may also include scaler circuitry for upconverting and downconverting content into the preferred output format of the user device 200, and converter circuitry for converting between digital and analog signals. The tuning and encoding circuitry may be used by user device 200 to receive, play, and buffer content. The circuitry described herein, including for example, the tuning, audio generating, encoding, decoding, encrypting, decrypting, scaler, and analog/digital circuitry, may be implemented using software running on one or more general purpose or specialized processors. If storage 208 is provided as a separate device from user device 200, the tuning and encoding circuitry may be associated with storage 208.

Storage 208 may be any device for storing electronic data, such as random-access memory, solid state devices, quantum storage devices, hard disk drives, non-volatile memory or any other suitable fixed or removable storage devices, and/or any combination of the same. Control circuitry 204 may allocate portions of storage 208 for various purposes, such as caching application instructions, recording media assets, storing portions of a media asset, buffering segments of media, etc.

A user may send instructions to control circuitry 204 using user input interface 210. User input interface 210 may be any suitable user input interface, such as a remote control, mouse, trackball, keypad, keyboard, touchscreen, touchpad, stylus input, joystick, voice recognition interface, or other user input interfaces.

Optionally, display 212 may be provided as a stand-alone device or integrated with other elements of each one of user device 200. For example, display 212 may be a touchscreen or touch-sensitive display. In such circumstances, user input interface 210 may be integrated with or combined with display 212. Display 212 may be one or more of a monitor, a television, a liquid-crystal display (LCD) for a mobile device, silicon display, e-ink display, light-emitting diode (LED) display, or any other suitable equipment for displaying visual images. Graphics processing circuitry may generate the output to the display 212. In some embodiments, the graphics processing circuitry may be external to processing circuitry 206 (e.g., as a graphics processing card that communicates with processing circuitry 206 via I/O path 202) or may be internal to processing circuitry 206 or control circuitry 204 (e.g., on a same silicone die as control circuitry 204 or processing circuitry 206). In some embodiments, the graphics processing circuitry and may be used to receive, display, play, and buffer content. In some embodiments, user device 200 may not have a display. For example, device 200 may be a voice-based digital assistant that interfaces with a user exclusively via microphone 216 and speakers 214.

Speakers 214 may be provided as integrated with other elements of user device 200 or may be stand-alone units. The audio component of videos and other content displayed on display 212 may be played through speakers 214. In some embodiments, the audio may be distributed to a receiver (not shown), which processes and outputs the audio via speakers 214. In some embodiments, speakers 214 may be used to output a security code. Speakers 214 may have a certain output power (e.g., 1 watt, 2 watts, etc.). In some embodiments, the power of speakers 214 may be used to determine output range (e.g., range at which output of speakers 214 is detectable) of user device 200.

The authorization application may be implemented using any suitable architecture. For example, it may be a stand-alone application wholly implemented on user device 200. The user interface application and/or any instructions for performing any of the embodiments discussed herein may be encoded on computer-readable media. Computer-readable media includes any media capable of storing data.

Figure 3:
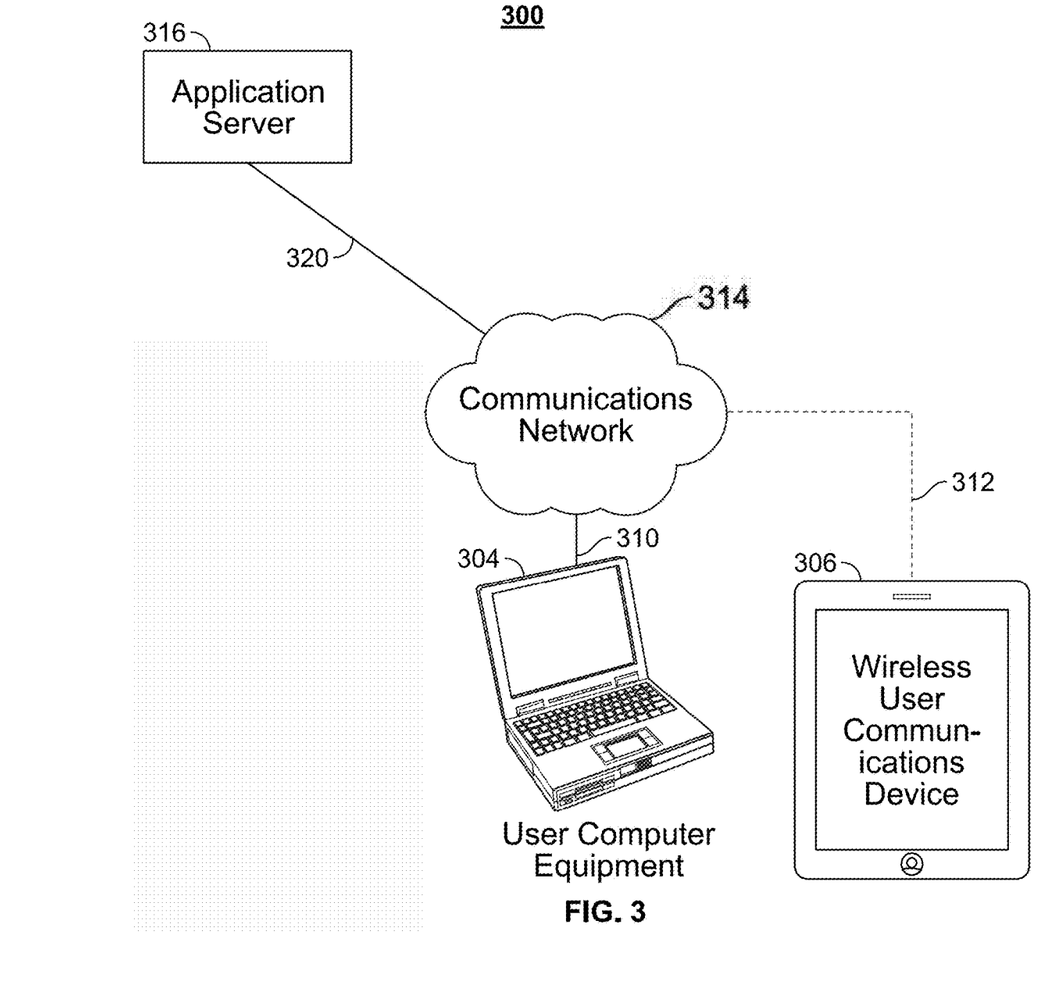
FIG. 3 is a diagram of an illustrative user device in accordance with some embodiments of the disclosure.

FIG. 3 depicts an exemplary media system in accordance with some embodiments of the disclosure. User device 106 and user device 110 can be implemented in system 300 of FIG. 3 as user computer equipment 304, wireless user communications device 306, or any other type of user equipment suitable for accessing media. For simplicity, these devices may be referred to herein collectively as user equipment. User equipment, on which the authorization application is implemented, may function as a stand-alone device or may be part of a network of devices. Various network configurations of devices may be implemented and are discussed in more detail below. In some embodiments, user device 110 may be implemented as user computer equipment 304, and mobile user device 106 may be implemented as wireless user communications device 306.

In system 300, there is typically more than one of each type of user equipment but only one of each is shown in FIG. 3 to avoid overcomplicating the drawing. In addition, each user may utilize more than one type of user equipment (e.g., a user may have a computer and a tablet) and also more than one of each type of user device (e.g., a user may have multiple television sets).

The user equipment may be coupled to communications network 314. Namely, user computer equipment 304 and wireless user communications device 306 are coupled to communications network 314 via communications paths 310 and 312, respectively. Communications network 314 may be one or more networks including the Internet, a mobile phone network, ad-hoc network, cable network, or other types of communications network or combinations of communications networks. Paths 310 and 312 may separately or together include one or more communications paths, including any suitable wired or wireless communications path or combination of such paths. Path 312 is drawn with a dotted line to indicate that in the exemplary embodiment shown in FIG. 3 it is a wireless path, and path 310 is drawn as a solid line to indicate it is a wired path (although this path may also be a wireless path). Communications with the user equipment may be provided by one or more of these communications paths but are shown as single paths in FIG. 3 to avoid overcomplicating the drawing. The user devices may communicate with each other directly through an indirect path via communications network 314 or through a direct path using a device-to-device network (e.g., Bluetooth).

System 300 includes application server 316 coupled to communications network 314 via communication path 320. Path 320 may include any of the communication paths described above in connection with paths 310 and 312. Communications with the application server 316 may be exchanged over one or more communications paths but are shown as single paths in FIG. 3 to avoid overcomplicating the drawing. In addition, there may be more than one application server 316, but only one is shown in FIG. 3 to avoid overcomplicating the drawing. Although communications between application server 316 with user equipment 304 and 306 are shown as through communications network 314, in some embodiments, application server 316 may communicate directly with user equipment 304 and 306 via communication paths (not shown) such as those described above in connection with paths 310 and 312.

Application server 316 may include one or more types of media distribution equipment such as a media server, cable system headend, satellite distribution facility, intermediate distribution facilities and/or servers, Internet provider, on-demand media server, and other media providers. Application server 316 may be the originator of media content or may not be the originator of media content. Application server 316 may also include a remote media server used to store different types of media content, in a location remote from any of the user devices. Systems and methods for providing remotely stored media to user equipment are discussed in greater detail in connection with Ellis et al., U.S. patent application Ser. No. 09/332,244, filed Jun. 11, 1999, which is hereby incorporated by reference herein in its entirety.

In some embodiments, application server 316 may be configured to provide any kind of application to any one of devices 304, 306. For example, application server 316 is an over-the-top (OTT) media distribution server configured to stream media. In some embodiments, application server 316 is an email server configured to provided email service to any one of devices 304, 306. In some embodiments, application server 316 may provide a productivity application, a sales application, a custom application, any other application, or any combination thereof. In some embodiments, devices 304, 306 must go through an authorization process before application server 316 is able to provide an access to its application. For example, any one of devices 304, 306 may be able to authorize application server 316 using a username/password scheme. In some embodiments, a multi-factor authorization may be required by application server 316. In one example, computer equipment 304 may be authorized to access application server 316 only after transmitting username/password information and further transmitting a temporary security code that was transmitted to wireless user device 306.

System 300 is intended to illustrate a number of approaches, or network configurations, by which user devices and sources of media content and guidance data may communicate with each other for the purpose of accessing media and data related to the media. The configuration of the devices and paths in system 300 may change without departing from the scope of the present disclosure.

Figure 4:
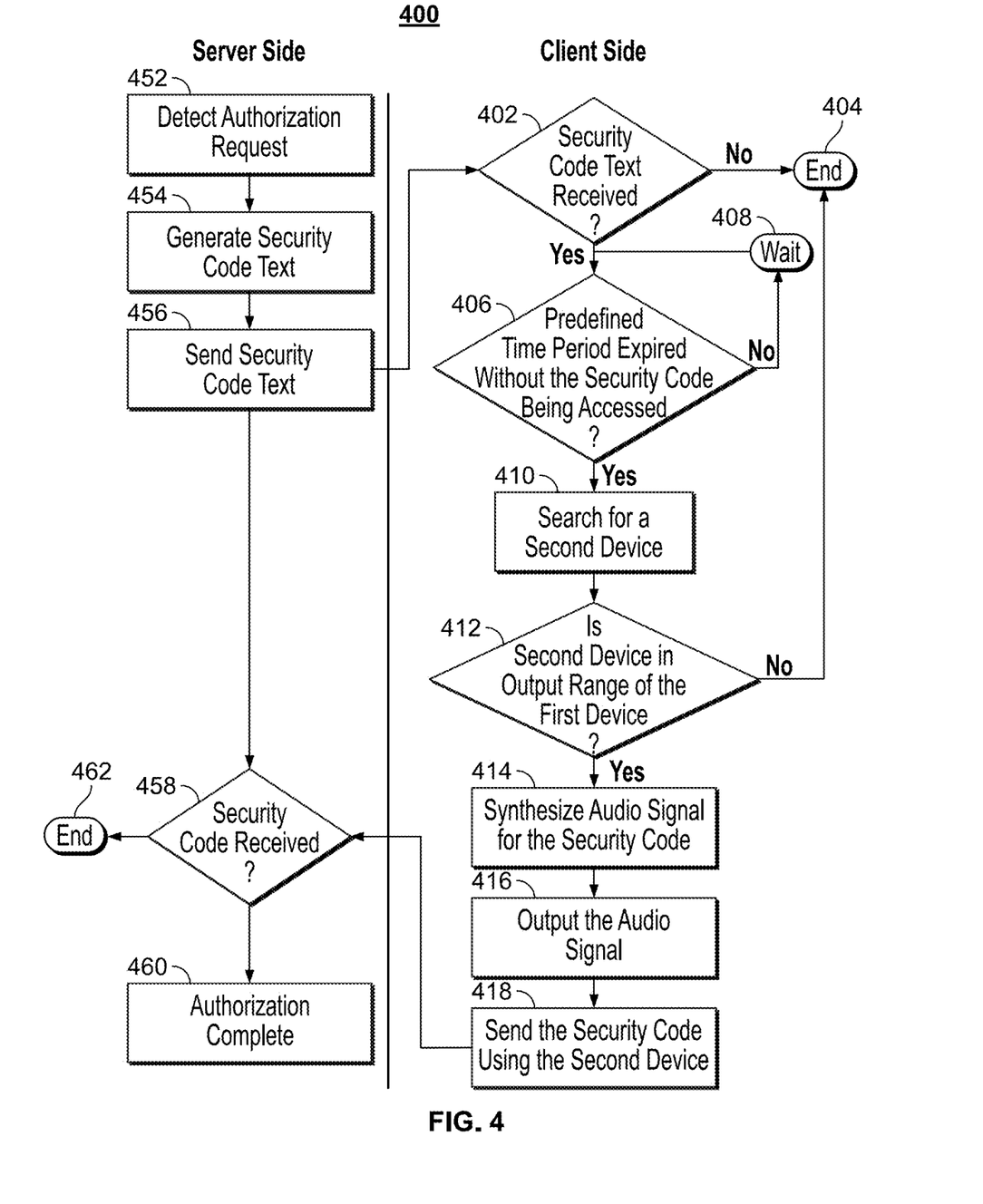
FIG. 4 is a flowchart of a detailed illustrative process for providing a security code, in accordance with some embodiments of the disclosure.

FIG. 4 is a flowchart of a detailed illustrative process 400 for providing a security code, in accordance with some embodiments of the disclosure. The client side part of process 400 may be executed by control circuitry 204 (e.g., in a manner instructed to control circuitry 204 by an authorization application). Control circuitry 204 may be a part of the user's media device (e.g., mobile user device 106) or of a remote server separated from the user equipment by way of communications network 314. The server side part of process 400 may be executed by a control circuitry of application server 316. In particular, process 400 depicts steps performed by devices of system 300 in response to a second device (e.g., user computer equipment 304) attempting to authorize with application server (e.g., application server 316).

At 452, an application server may detect an authorization request. For example, the application server may detect a request that includes a username/password combination sent by a second device (e.g., user computer equipment 304). For example, the user may be attempting to log in to an OTT media content application from the second device by providing his or her username and password to the application server (e.g., the server of the OTT content provider).

At 454, in response to detecting an authorization request, the application server may generate a security code text. For example, the security code may be a randomly or pseudo-randomly generated string of numbers. At 456, the authorization application may transmit the security code to a first device (e.g., wireless user communications device 306). In some embodiments, the security code is transmitted via a cellular network as an SMS message.

At 402, control circuitry 204 may check whether a security code text is received. For example, control circuitry 204 may check if any incoming messages include text "security code." In some embodiments, control circuitry 204 recognizes any message that includes a string of random numbers as a security code. If no security code is received, process 400 ends at step 404. If the security code is received, process 400 continues at 406.

At 406, control circuitry 204 may check whether a predefined time period (e.g., 15 seconds) has expired without the security code being accessed. For example, control circuitry 204 may check, via an API call to a text-messaging application, whether an SMS message with the security code is marked as read or unread. SMS message being marked unread may indicate that the security code was not accessed. If the predefined time has not expired yet, control circuitry 204 may proceed to step 408, where it times out for a short period of time (e.g., 1 second). After the time-out, control circuitry 204 proceeds back to step 406 and re-rechecks if the security code was accessed. If the code was accessed, process 400 may end immediately. If the predefined time period expired without the security code being accessed, process 400 proceeds to 410.

At 410, control circuitry 204 may search for the second device (e.g., user computer equipment 304). For example, control circuitry 204 may measure a distance between the first and second device to check if the second device is locally available. If the second device is found, control circuitry 204 proceeds to 412, where it checks whether the second device is within output range of the first device. This determination may be performed as described below with respect to FIG. 6. If the second device is not within the output range, process 600 may end at step 408. If the second device is within the output range, control circuitry 204 may proceed to step 414.

At 414, control circuitry 204 may synthesize an audio signal for the security code received at step 402. For example, control circuitry 204 may apply a text-to-speech algorithm to the security code. Then, at 416, control circuitry 204 may output the synthesized audio signal. For example, control circuitry 204 may cause the synthesized audio signal to be played using speakers 214. In some embodiments, control circuitry 204 may instead output an encrypted representation of the security codes via a short-range communication channel (e.g., via Bluetooth or Wi-Fi). The message may be encrypted using any encryption technique, such as Data Encryption Standard (DES) or Rivest-Shamir-Adleman (RSA) encryption.

At 418, control circuitry of the second device may send the security code back to the application server at part of the multi-factor authorization attempt. In some embodiments, the security code is sent after the second device receives the representation of the security code. In some embodiments, the security code is sent after the second device receives the synthesized audio signal using a microphone (e.g., microphone 216), recovers the text of the security code (e.g., via speech-to-text algorithm) and automatically forwards the received text of the security code to the application server. In some embodiments, the security code is sent automatically after being received via the short-range communication channel. In such embodiments, the second device may decrypt the security code before sending it to the application server.

At 458, the application server checks if the security code was received. If the security code was not received before it expired (e.g., in 1 minute), process 400 ends at 462. If the security code was timely received, process 400 continues at 460. At 460, the application server determines that the authorization is complete. Afterwards, the application server may grant application access to the second device. For example, the second device may gain an ability to stream OTT media content from the application server, an ability to access email via the application server, or access any other service provided by the application server.

Figure 5:
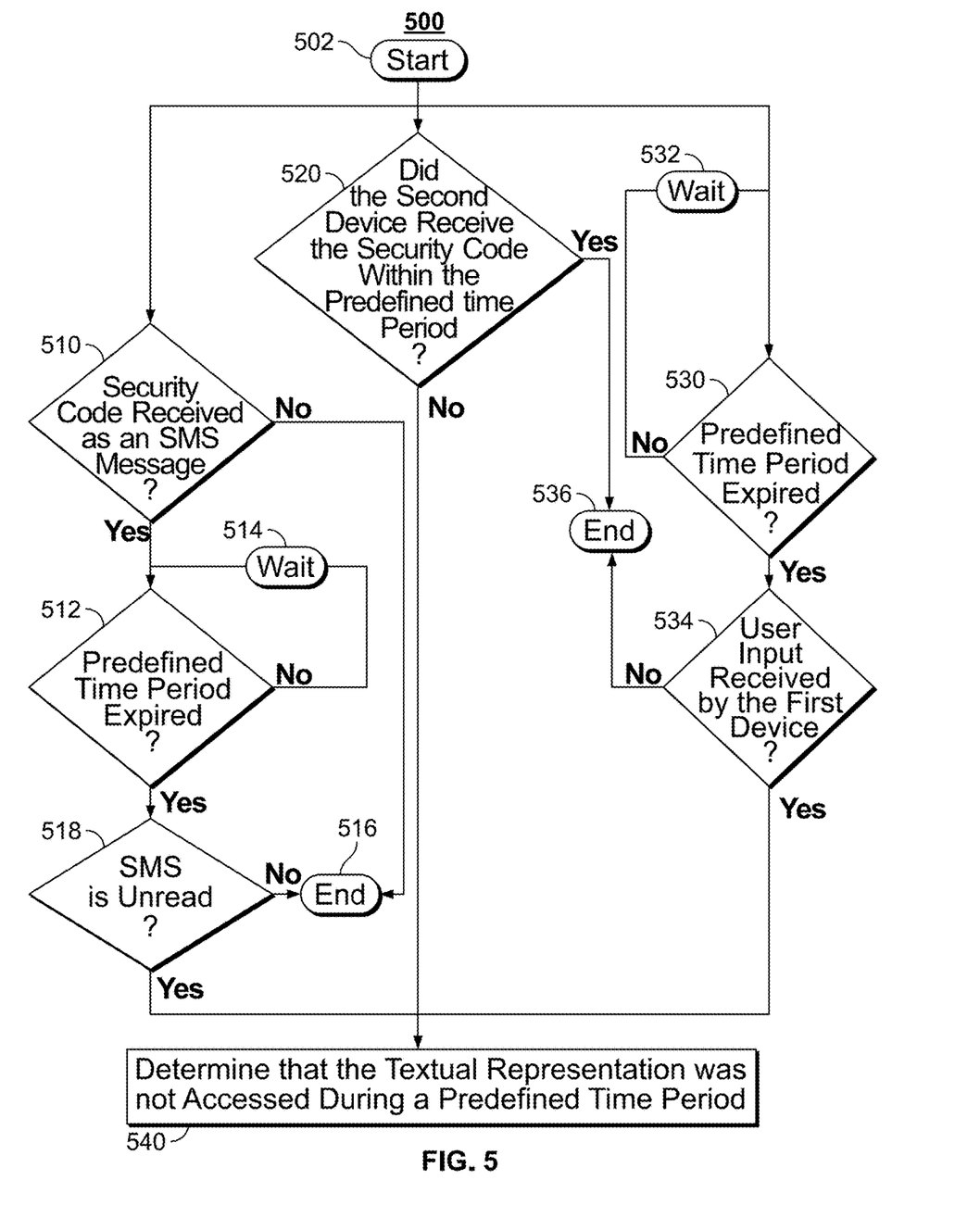
FIG. 5 is a flowchart of an illustrative process for determining whether a security code was accessed, in accordance with some embodiments of the disclosure.

FIG. 5 is a flowchart of a detailed illustrative process 500 for determining whether a security code was accessed, in accordance with some embodiments of the disclosure. Process 500 may be executed by control circuitry 204 (e.g., in a manner instructed to control circuitry 204 by an authorization application). Control circuitry 204 may be a part of user's device (e.g., mobile user device 106), or of a remote server separated from the user device by way of communications network 314. In some embodiments, process 500 may be performed as part of step 406 of FIG. 4.

Process 500 starts at 502, (e.g., in response to step 406 being performed by control circuitry 204). In some embodiments, process 500 may perform one or more of steps 510-518, 520, or 530-534 to check if the security code was accessed.

At 510, control circuitry 204 checks if a secure code was received as an SMS message. For example, control circuitry 204 may use an API call to a text-messaging application to determine that an SMS message with the security code was received. If no such SMS message is received, process 500 ends at 516. If the SMS message with the security code is received, process 500 continues at 512.

At 512, control circuitry 204 may check if a predefined time period has expired. The predefined time period may be preset (e.g., it may be preset at 30 seconds). In some embodiments, the predefined time period may be calculated dynamically. For example, if the SMS message includes data that the security code will expire in 60 seconds, control circuitry 204 may set the predefined time period to one half of that time (i.e., to 30 seconds). If the predefined time period has not yet expired, process 500 proceeds to time out at step 514 (e.g., for 1 second), and returns back to 512 for another check. If the predefined time period has expired, process 500 proceeds to 518.

At 518, control circuitry 204 checks if the SMS message is unread. For example, control circuitry 204 may issue an API call to the text-messaging application to check if the SMS message with the security code is marked as "read" or as "unread." If the SMS message is marked "read," process 500 ends at 516. Otherwise, process 500 proceeds to 540.

Process 500 may also proceed to step 520 after step 502. At 520, control circuitry 204 may check whether the second device received the security code during the predefined time period. For example, the second device may have send an acknowledgement to the first user device that the security code was received. If such an acknowledgement is received, process 500 may end at 536. Otherwise, process 500 proceeds to 540.

Process 500 may also proceed to step 530 after step 502. At 530, control circuitry 204 may check if a predefined time period has expired. If the predefined time period has not yet expired, process 500 proceeds to time out at step 532 (e.g., for 1 second), and returns back to 530 for another check. If the predefined time period has expired, process 500 proceeds to 534. At 534, control circuitry 204 may check if any user input was received by the first device during the predefined time period. This determination may be made by issuing an API call to operating systems of the first user device that tracks all user inputs. If some input was not received, process 500 ends at 536, otherwise, process 500 proceeds to 540.

At 540, control circuitry 204 makes a determination that the textual representation of the security code was not accessed. The result of this determination may be provided to process 400 at step 406. In some embodiments, process 400 then proceeds to step 410.

Figure 6:
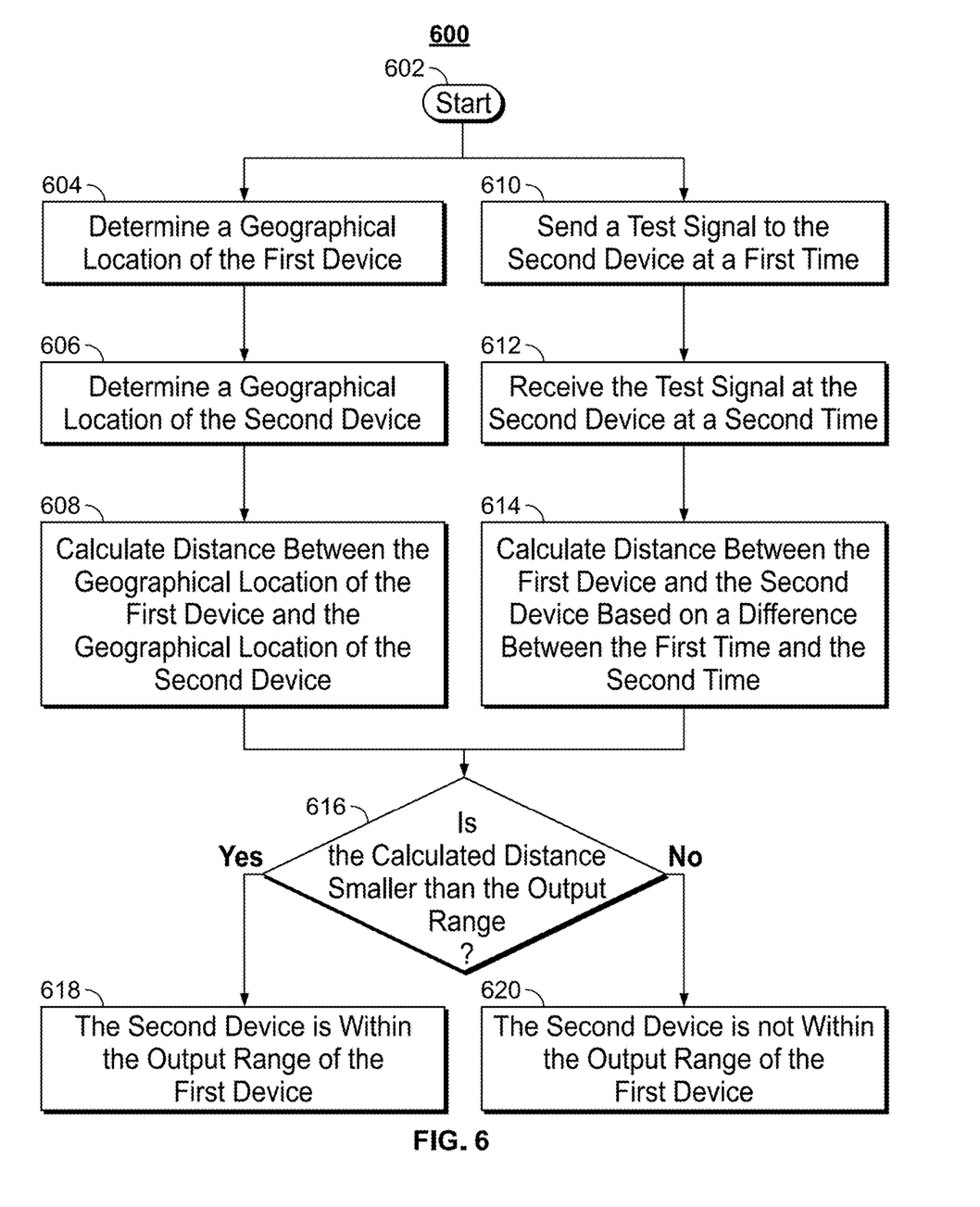
FIG. 6 is a flowchart of an illustrative process for determining if a second device is within output range of the first device, in accordance with some embodiments of the disclosure.

FIG. 6 is a flowchart of a detailed illustrative process 600 for determining if a second device is within output range of the first device, in accordance with some embodiments of the disclosure. Process 600 may be executed by control circuitry 204 (e.g., in a manner instructed to control circuitry 204 by an authorization application). Control circuitry 204 may be a part of a user's device (e.g., mobile user device 106, or of a remote server separated from the user device by way of communications network 314. In some embodiments, process 600 may be performed as part of step 412 of FIG. 4.

Process 600 starts at 602 (e.g., in response to step 412 being performed by control circuitry 204). In some embodiments, process 600 may then perform one or more of steps 604-608, 610-614 to check if the second device is within the output range of the first device. In some embodiments, control circuitry 204 may first determine the output range of the first device. For example, control circuitry 204 may determine output power of a speaker of the first device. For example, control circuitry 204 may access hardware specification of the first device. In some embodiments, the hardware specification of the first device may list the power rating of the speaker (e.g., speaker 214). In some embodiments, control circuitry 204 may then determine the output range based on the output power of a speaker. For example, control circuitry 204 may use a lookup table that correlates the output power with the output range. In some embodiments, control circuitry 204 may directly acquire the output range from a local memory. In some embodiments, control circuitry 204 may adjust the output range based on environmental factors. For example, if the first device is located indoors, the output range may be increased, while if the first device is located outdoors, the output range may be decreased.

At 604, control circuitry 204 may determine a geographical location of the first device. For example, control circuitry 204 may query a GPS sensor of the first device for a geographical location. In some embodiments, control circuitry 204 may determine a geographical location of the first device using a triangulation technique that relies on signal strengths of cell signals received from at least three cell towers.

At 606, control circuitry 204 may determine a geographical location of the second device. For example, control circuitry 204 may query a GPS sensor of the second device for a geographical location. In some embodiments, control circuitry 204 may determine a geographical location of the second device using a triangulation technique that relies on signal strengths of cell signals received from at least three cell towers.

At 608, control circuitry 204 may calculate a distance between the geographical location of the first device and the geographical location of the second device. For example, control circuitry 204 may calculate the length of a shortest path between the geographical location of the first device and the geographical location of the second device.

At 610, control circuitry 204 may send a test signal to the second device at a first time. For example, control circuitry 204 may cause a speaker of the first device to output a test audio signal. The time of the output may be time-stamped.

At 612, the second device may receive the test signal (e.g., via a microphone of the second device). The time of receipt of the test signal may also be time-stamped. In some embodiments, the receipt time stamp is sent to the first device (e.g., via a network or via short-range communication channel).

At 614, control circuitry 204 may calculate a distance between the first device and the second device based on a difference between the output time stamp and the second time stamp. For example, control circuitry 204 may determine the time difference to be 0.045 seconds. In some embodiments, control circuitry 204 multiplies the time difference by the speed of sound to calculate the distance between the first device and the second device. For example, control circuitry 204 may multiply 0.045 seconds by the speed of sound (1125 feet per second) to calculate that the distance between the first device and the second device is 50 feet.

At 616, control circuitry 204 checks if the calculated distance is equal to or smaller than the output range of the first device. If the calculated distance is smaller than the output range of the first device, process 600 proceeds to 618 where it determines that the second device is within the output range of the first device. Otherwise, process 600 proceeds to 620 where it determines that the second device is not within the output range of the first device.

Figure 7:
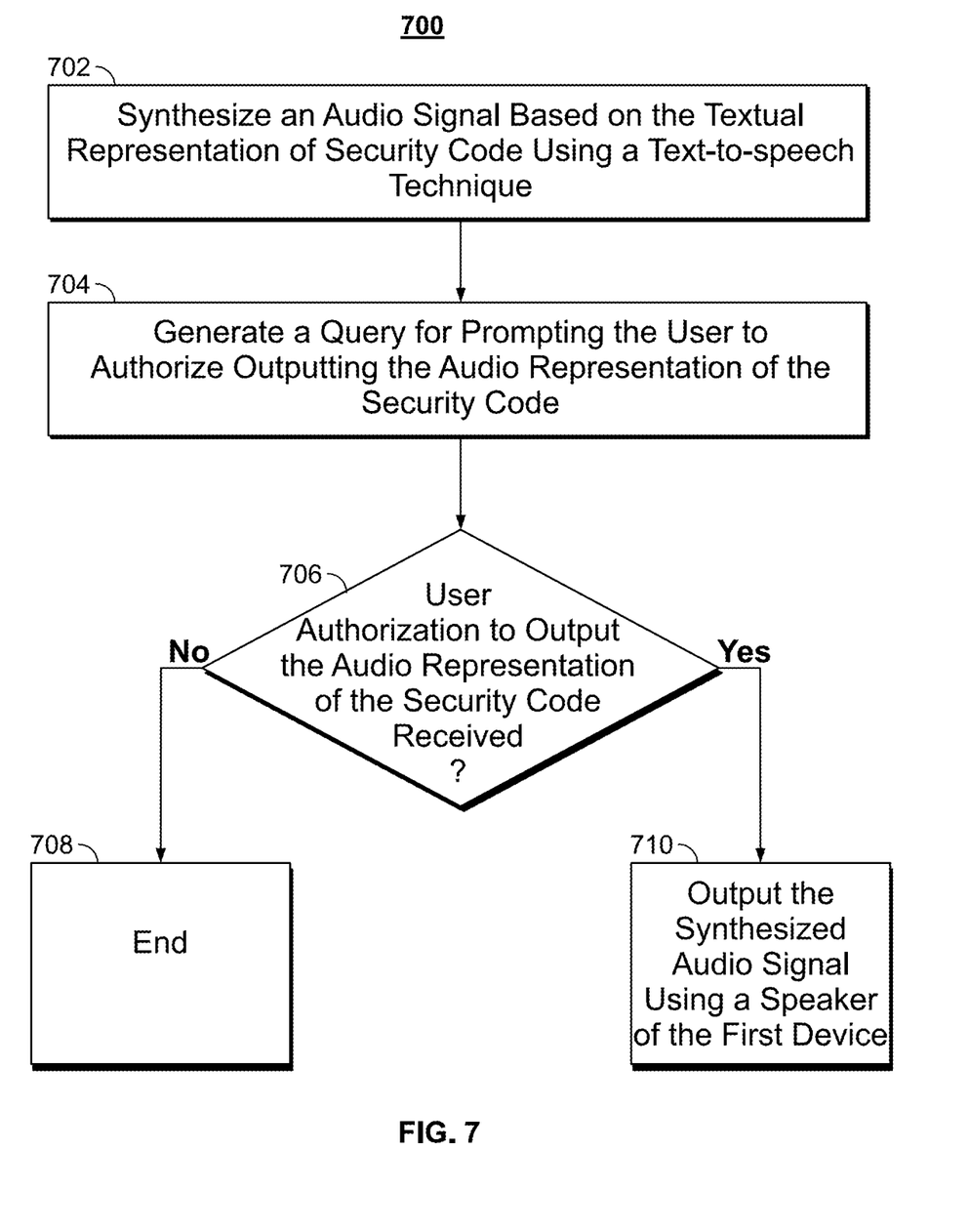
FIG. 7 is a flowchart of another illustrative process for providing a security code, in accordance with some embodiments of the disclosure.

FIG. 7 is a flowchart of a detailed illustrative process 700 for providing a security code, in accordance with some embodiments of the disclosure. Process 700 may be executed by control circuitry 204 (e.g., in a manner instructed to control circuitry 204 by an authorization application). Control circuitry 204 may be a part of user's device (e.g., mobile user device 106) or of a remote server separated from the mobile user device by way of communications network 314. In some embodiments, process 700 may be performed as part of step 418 of FIG. 4

At an optional step 702, control circuitry 204 may synthesize the audio signal based on the textual reputation of a security code (e.g., code received at step 402). For example, control circuitry 204 may create an audio wave that represents a pronunciation of each digit or character of the security code. In some embodiments, step 702 may be performed as part of step 710 instead.

At 704, control circuitry 204 may generate a query for prompting the user to authorize outputting the audio representation of the security code. For example, control circuitry 204 may generate a voice prompt "Security code received. Play it now?" In some embodiments, control circuitry 204 outputs the query via speaker 214. In some embodiments, control circuitry 204 may send the query as a text message to the second user device.

At 706, control circuitry 204 checks whether user authorization to output the audio representation of the security code was received. For example, control circuitry 204 may detect using a microphone 216 that the user said "Yes" or "Give me the code!" In some embodiments, control circuitry 204 receives the authorization via a communication network (e.g., communication network 314) from the second device. If no output authorization is received, process 700 may end at step 708. Otherwise process 700 proceeds to step 710, where control circuitry 204 outputs the synthesized audio signal (e.g., waveform synthesized at step 702) using a speaker of the first device (e.g., speaker 214).

It should be noted that processes 400-700 or any step thereof could be performed on, or provided by, any of the devices shown in FIGS. 2-3. For example, the processes may be executed by control circuitry 204 (FIG. 2) as instructed by a notification delivery application implemented on user device 106 and/or application server 316. In addition, one or more steps of a process may be incorporated into or combined with one or more steps of any other process or embodiment. In addition, the steps and descriptions described in relation to FIGS. 4-7 may be done in alternative orders or in parallel to further the purposes of this disclosure. For example, each of these steps may be performed in any order or in parallel or substantially simultaneously to reduce lag or increase the speed of the system or method.

It will be apparent to those of ordinary skill in the art that methods involved in the present invention may be embodied in a computer program product that includes a computer-usable and/or -readable medium. For example, such a computer-usable medium may consist of a read-only memory device, such as a CD-ROM disk or conventional ROM device, or a random-access memory, such as a hard drive device or a computer diskette, having a computer-readable program code stored thereon. It should also be understood that methods, techniques, and processes involved in the present disclosure may be executed using processing circuitry.

The processes discussed above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

While some portions of this disclosure may make reference to "convention," any such reference is merely for the purpose of providing context to the invention(s) of the instant disclosure, and does not form any admission as to what constitutes the state of the art.

What is claimed is:

1. A method for retrieving a secure message of security code comprising:
receiving, at a first electronic device, a prompt to enter the security code for the first electronic device to obtain authorization, wherein the security code is transmitted to a second electronic device;
determining that the security code was not entered into the first electronic device within a predefined time period;
in response to the determining that the security code was not entered into the first electronic device within the predefined time period, causing the second electronic device which is within an output range of the first electronic device to generate an audio output of the security code that was transmitted to the second electronic device to expedite the authorization; and
transmitting, by the first electronic device the security code that has been entered in response to the prompt to obtain the authorization.

2. The method of claim 1, wherein, the prompt is displayed on a display of the first electronic device in response to an attempt to log into a service provided by an application server.

3. The method of claim 2, further comprising, upon logging into the application server, the application server providing access to media content stored in the application server.

4. The method of claim 2, wherein the application server is an over-the-top (OTT) media distribution server configured to stream media.

5. The method of claim 1, wherein the time period is predefined by an authorization application of the second electronic device.

6. The method of claim 1, wherein determining that the security code was not entered into the first electronic device comprising:
querying, by an authorization application of the second electronic device, a read/unread status of a Short Message Service (SMS) message that includes the security code; and
in response to the query, not receiving a response of the read/unread status of the SMS.

7. The method of claim 1, wherein the audio output of the security code is generated by the second electronic device in response to a user of the second device authorizing the audio output of the security code by the second device.

8. The method of claim 1, wherein generating the audio output of the security code by the second device comprising:
synthesizing an audio signal based on the security code received from the first electronic device, wherein the security code includes a textual representation;
converting the textual representation to an audio output using a text-to-speech application of the second electronic device; and
outputting the synthesized audio output using a speaker of the second device.

9. The method of claim 1, further comprising:
determining output power of a speaker of the first electronic device; and
causing the second electronic device to generate the audio output of the security code if the output power of the speaker is above a predefined audio threshold.

10. The method of claim 1, wherein an application server determines if the security code was entered into the first electronic device within the time period, wherein the application server is connected to the first and second device through a network.

11. A system for retrieving a secure message of security code comprising:
input circuitry of a first electronic device configured to:
receive, at the first electronic device, a prompt to enter the security code required for the first electronic device to obtain authorization, wherein the security code is transmitted to a second electronic device; and
control circuitry of the first electronic device configured to:
determine that the security code was not entered into the first electronic device within a predefined time period;
in response to the determining that the security code was not entered into the first electronic device within the predefined time period, causing the second electronic device which is within an output range of the first electronic device to generate an audio output of the security code that was transmitted to the second electronic device to expedite the authorization; and
transmit, by the first electronic device the security code that has been entered in response to the prompt to obtain the authorization.

12. The system of claim 11, wherein, the prompt is displayed on a display of the first electronic device in response to an attempt to log into a service provided by an application server.

13. The system of claim 12, further comprising, upon logging into the application server, the application server providing access to media content stored in the application server.

14. The system of claim 12, wherein the application server is an over-the-top (OTT) media distribution server configured to stream media.

15. The system of claim 11, wherein the time period is predefined by an authorization application of the second electronic device.

16. The system of claim 11, wherein determining that the security code was not entered into the first electronic device comprising:
querying, by an authorization application of the second electronic device, a read/unread status of a Short Message Service (SMS) message that includes the security code; and
in response to the query, not receiving a response of the read/unread status of the SMS.

17. The system of claim 11, wherein the audio output of the security code is generated by the second electronic device in response to a user of the second device authorizing the audio output of the security code by the second device.

18. The system of claim 11, wherein generating the audio output of the security code by the second device comprising:
synthesizing an audio signal based on the security code received from the first electronic device, wherein the security code includes a textual representation;
converting the textual representation to an audio output using a text-to-speech application of the second electronic device; and
outputting the synthesized audio output using a speaker of the second device.

19. The system of claim 11, further comprising:
determining output power of a speaker of the first electronic device; and
causing the second electronic device to generate the audio output of the security code if the output power of the speaker is above a predefined audio threshold.

20. The system of claim 11, wherein an application server determines if the security code was entered into the first electronic device within the time period, wherein the application server is connected to the first and second device through a network.

* * * * *